Oct. 6, 1925.
J. KONAR
FOUR-CYCLE GAS ENGINE
Filed March 18, 1922
1,555,991
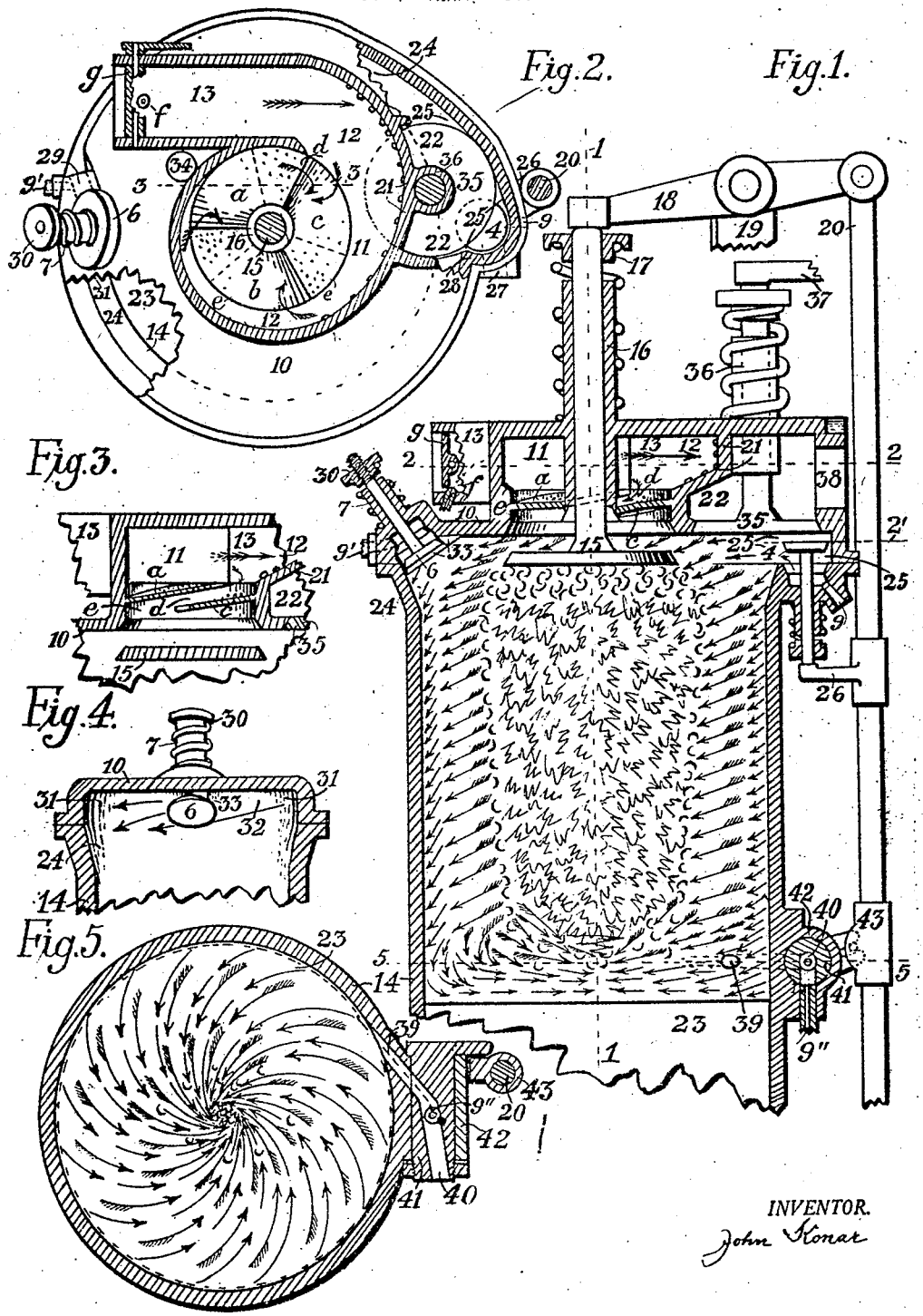
INVENTOR.
John Konar Patented Oct. 6, 1925.

1,555,991

UNITED STATES PATENT OFFICE.

JOHN KONAR, OF CHICAGO, ILLINOIS.

FOUR-CYCLE GAS ENGINE.

Application filed March 18, 1922. Serial No. 544,835.

*To all whom it may concern:*

Be it known that I, JOHN KONAR, a citizen of the United States, residing at Chicago, county of Cook, and State of Illinois, have invented a new and useful Four-Cycle Gas Engine, of which the following is a specification.

My invention relates to four-cycle gas engines in which the intake and exhaust ports are located adjacent one another in the upper end of the cylinder and the objects of my invention are, first, to give a whirling motion to the incoming charge; second, to thoroughly cleanse the cylinders of carbon; third, to heat the less volatile fuel particles of the new charge by the burnt charge without heating the whole charge; fourth, to force the incoming charge through a curved passageway so that the heavier portions of the same are forced against a heated wall; fifth, to provide the fuel intake with helically slanting screw blades to turn and volatize the charge; sixth, to provide means for feeding air into the cylinder to form a thin film of air adjacent the inner walls of the cylinder; seventh, to cool the interior of the cylinder and the piston head with air or water and derive additional power from such cooling without additional cost; eighth, to make a combined gas and hot air engine; ninth, to make a combined gas and steam engine; tenth, to economize in fuel and make a more efficient engine and other features to become apparent from the description to follow.

In the operation of four-cycle gas engines it is very desirable to have the combustible charge thoroughly mixed, to completely clean the cylinder of unburned carbon, to make use of the exhaust heat, to thoroughly volatize the fuel of the incoming charge, to cool the cylinder from within, to utilize the expanding hot air to assist pushing the piston and to utilize the formation of steam to increase the pressure on the piston, and the use of my invention embodies all these desirable features.

To describe my invention so that others versed in the art to which it pertains can make and use the same, I have illustrated it on the accompanying sheet of drawing forming a part of this specification in which:—

Figure 1, is a central vertical sectional view through a cylinder of an engine embodying my invention and shows the engine near the end of the intake stroke; Fig. 2, is a cross sectional view taken on line 2—2 of Fig. 1, looking down; Fig. 3, is a detail sectional view taken on line 3—3 of Fig. 2; Fig. 4, is a detail sectional view taken on line 4—4 of Fig. 2; and Fig. 5, is a cross sectional view taken on line 5—5 of Fig. 1, looking down. Similar reference characters refer to similar parts throughout the several views.

Within the cylinder 14 is fitted to slide in the usual manner the piston 23 connected to the crank shaft not shown and which in turn has the usual operating connections with the valve rod 20 shown adjacent the cylinder and having its upper end pivotally connected to one end of the rocker arm 18 pivotally connected midway its length to a suitable bracket 19. As clearly shown in Fig. 1, the free end of arm 18 engages the upper end of the stem of the intake puppet valve 15 opening inwardly into the cylinder and controlling the annular vent $e$ of the intake port 11; a suitable arm 26 secured on valve rod 20 is arranged to engage the lower end of the stem of valve 4, which controls an auxiliary intake port, and a second suitable arm 43 secured on valve rod 20 is arranged to operate the valve 41 which controls an intake port at the lower end of the cylinder.

I prefer to make the upper end of the bore of the cylinder 14 with a flaring enlargement as shown at 24 and to make the removable upper end of the cylinder to embody the exhaust valve and port and the intake valve and port together with its associated overhead throat and novel fuel passage. The longitudinal axis of the intake valve 15 preferably coincides with the longitudinal axis of the cylinder 14 as indicated by the dotted line 1—1 so that the incoming fuel charge which enters in a whirling stream will contact with the valve disc and be distributed to all sides of the cylinder equally in a whirling fashion.

To give the incoming fuel charge a whirling motion I provide in the annular vent $e$ three helically slanting screw blades $a$, $b$, and $c$, which partly overlap one another to form the passageways $d$, as seen in Fig. 3, between them. The blades $a$, $b$, and $c$ will become heated by their close proximity to the hot intake valve 15 and will cut turn and volatize the confluent fuel mixture in thin slices whereby an increased quantity of heavier and less volatile portions of the fuel will contact with the hot blades and be volatized to a greater degree, and again when the sliced charge passes against the hot valve disc 15 the heavier particles will contact with the same and be completely volatized. This whirling motion given to the charge as it enters the cylinder and the piston 23 draws away from the cylinder head 10 causes the charge to follow the piston downwardly in a whirling cylindrical form as indicated in Fig. 1, by the one side feathered arrows, and on the piston head the fuel charge turns towards the center of the cylinder to twist together into a short vortex neck, as is indicated in Figs. 1 and 5 by the same arrows, whereabout the charge becomes thoroughly mixed and atomized by a rapid centrifugal dissipation from the vortex neck into the space of the vacuum created under the valve 15 as indicated in Fig. 1, by the zig-zag lines. The vacuum is intensified by the centrifugal action of the whirling charge.

I prefer to furnish a fuel passage in connection with the intake to pre-volatize the fuel of the charge especially when a heavy grade of fuel is used, which passage 13 is connected to the intake 11 by the intermediate scroll shaped passage 12 which causes the incoming fuel to pass around in a clockwise direction as viewed in Fig. 2. As seen in Figs. 1 and 2, the exhaust passage 22 is provided in the cylinder head 10 adjacent to the passage 12 with a wall 21 between them. As the fuel charge is drawn in through passages 13 and 12 and the intake 11 the heavier particles are forced to fly tangentially by their momentum against the wall 21 as indicated by small irregular circles in Figs. 1 and 2. The wall 21 is heated by the passing exhaust gases and such contact with this hot wall will tend to volatize such particles. As the fuel charge passes along in the scroll passage 12 and to the intake 11 it is given a whirling motion clock-wise and as it passes downwardly through the intake 11 and between the screw blades a, b, and c, the direction of its whirling motion is reversed to a non-clockwise direction. Such reversal of rotation of the fuel charge increases the turbulence of the fuel mixture and forces all the heavier particles of the charge to be precipitated onto the hot upper surfaces of the blades a, b, and c, as indicated by small dots in Figs. 1 and 2, and thus be thoroughly volatized. In Figs. 1 and 2, I have indicated a butterfly valve at g and a small orifice in the lower wall of passage 13 at f through which a jet of kerosene or similar heavy fuel may be supplied. The location for the spark plug is indicated in Fig. 2, by the circle 34, adjacent the intake 11.

The exhaust valve 35 is provided with a stem passing up through a guide 36 and has its upper end operatively engaged by the end of an arm 37 which is properly timed to open the valve 35 during the exhaust period against the tension of a spring provided to normally hold the valve in a closed position. The stem of valve 15 passes up through a guide 16 and a suitable spring is interposed between the top of the cylinder head and a collar 17 secured to the valve stem, to normally hold the valve 15 in a closed position.

For the purpose of forming a thin film of air adjacent the inner wall of the cylinder and the top surface of the piston head and enveloping the fuel charge within the cylinder with air during its whirling action, thereby serving the three-fold purpose of cooling the interior of the cylinder, preventing the accumulation of carbon on the interior of the cylinder and avoiding incandescent spots on the interior of the cylinder; I provide one or more air inlet valves at the upper end of the cylinder and near the peripheral edge of the intake valve 15. The intake passage of such air inlet valves is made on such tangent with the curve of the cylinder wall that the air thus entering will be given a whirling motion in the same direction as the fuel charge is whirling, i. e. non-clockwise as viewed in Figs. 2 and 5, so as to hug the walls of the cylinder and increase the whirling fuel charge. In the drawings I show two such air inlet valves, the valve 4 on the right side and the valve 6 on the left side. The valve 4 is normally held in a closed position by the usual coiled expanding spring and is opened by means of the valve rod 20 as above described. The air enters the chamber below the valve 4 through the opening 27, Fig. 2, thence passes upward past the valve seat and finally through the tangential passageway 25 into the interior of the cylinder where it sweeps around and around on the inner wall of the cylinder and traveling downward as fast as the piston moves downward. The air from the valve 4 is prevented from passing around clockwise in the cylinder because of the abrupt shoulder 28 formed on the one side of the same, (see Fig. 2), and similarly the air coming in through valve 6 is prevented from passing around clockwise in the cylinder because of the corner fillet 32 on one side of the same and whose end 33 registers with the edge of the valve opening. The air entrance for the valve 6 is shown at 29, Fig. 2. To increase the cooling effect on the interior of the cylinder I may supply a small jet of water at the air valves 4 and 6 through the openings 9 and 9' respectively.

In addition to the air inlets 27 and 29 at the upper end of the cylinder I may employ the additional inlet 40 at the lower end of the cylinder which admits air into the cylinder when the piston has nearly reached the end of its outward or downward stroke.

The exit of this inlet into the cylinder is made on a tangent as shown in Fig. 5, at 39, so that the air thus admitted will also take a whirling motion in the cylinder in a non-clockwise direction thus assisting in the cooling of the interior of the cylinder and providing a thick air filler near the periphery of the piston head, whereby leakage of fuel and the setting of carbon around the piston is prevented. The air thus admitted is controlled by a suitable valve 41 mounted in the boss 42 integral with the cylinder 14. The valve 41 is operatively connected to the valve rod 20 by means of the lug 43 which is secured to the rod 20 and engages a bifurcated arm extending from the valve 41, so that the valve 41 is opened and closed at the proper time. A small inlet 9'' for water is provided in the boss 42 which is also controlled by the valve 41. Water may or may not be admitted in the ports 9, 9' and 9''.

In the design shown in the drawing it will be noted that the exhaust valve 35 is made of such size that it partly extends outside of the plane of the cylinder walls; this construction may be objectionable because of rupturing the air envelope around the fuel charge during compression and firing; therefore to correct this the construction of the cylinder head may be made with two small valves located to take the place of the one large valve 35 and come entirely within the plane of the cylinder walls while the exhaust exit 38 would remain practically in the same place.

In operation, starting with the piston practically at the end of its outward stroke as shown in Fig. 1, the cycle of movement will be as follows: The intake valves 15, 6, 4 and 41 will be closed; the piston 1 moves in to compress the charge; ignition takes place; the piston 1 moves outward on its power stroke; exhaust valve 35 opens and the piston 1 moves inward on its exhaust or scavenging stroke; the exhaust valve 35 closes and the intake valves 15, 6 and 4 open; the piston 1 moves outward on its suction stroke and the combustible charge is drawn through port 13, curved passageway 12 and through intake 11 between the helically slanting screw blades $a$, $b$, and $c$, while incombustible air or water vapor is drawn in through valves 4 and 6 and finally through valve 41. During the entire movement of the piston 1 outward on its suction stroke the incombustible air or moisture envelope will hug the walls of the cylinder while circulating round and round and contacting with the end of the piston 1 will rush toward the center above the piston head to twist upward into the vortex of the combustible charge while the combustible charge will circle round and rou. just within the layer of air and travel in the form of a rotating cylinder extending downward behind the piston, striking the air cushion on top of the piston end and thence rush scroll fashion toward the center of the cylinder as shown in Fig. 5, and then twirl upward with the air into a common vortex to thoroughly mix therewith and to fill the vacuum created by the centrifugal action of the whirling charge and by the outward moving piston. The air or vapor is indicated by the plain arrows, the combustible charge is indicated by the one side feathered arrows, the intermingled mixture is indicated by the irregular zig-zag lines and the residual products of combustion or burnt gases are indicated by the small crescent shaped lines. The heaviest fuel particles volatize on the hot disk of the intake valve into a vapor which circumfuses from the edge of the disk over and around the hot residual gas scattering from underneath the valve and spinning downward, as shown by little crescents in Fig. 1; thereby the vapor is highly heated and is kept hot by the heat of the residue until both are rapidly absorbed by the turbulent vortex of the fuel mixture in the vacuum above the middle of the piston head as illustrated in Fig. 5 by bending arrows. The base of the rotating cylinder of fuel mixture with its inner influx of residual gas and with its outer coating of air is continuously undergoing a very thorough mixing when filling the inner interior of the cylinder, while at the end of the intake stroke only the outer thin layer of air around the cylindrical fuel charge and adherent to the inner metallic cylinder wall and to the piston head remains free of fuel and in an incombustible condition to protect the cylinder wall against overheating and against carbon setting.

The piston uncovers near the end of its crankward stroke the valved air inlet port 39 which is tangentially disposed to the inner periphery of the cylinder to admit a circular filler of air around the piston head, as shown in Fig. 5, by short dotted lines. This same cycle of movement is repeated continuously. Thus by a layer of air the interior of the cylinder is kept clean and is cooled during every cycle and the leakage of fuel into the crank case is prevented.

While all three air inlet ports, 4, 6, and 39 may be adapted in combination with one gas engine, also either one of the air ports may be used singly to advantage to suit economy and a particular purpose.

When air alone is admitted at valves 4, 6, and 41 the engine practically becomes a combined gas and hot air engine, because as the air envelope is taken into the cylinder it is cool and when heated during firing of the combustible charge the air expands under the rising temperature and creates a pressure within the cylinder. When water vapor is taken in at the valves 4, 6 and 41 the engine practically becomes a combined gas and steam engine, because a moisture envelope is thereby formed around the fuel charge and is heated by the fire of the charge and is converted into steam, thus producing a pressure within the cylinder. Since the incombustible air or vapor practically fills the peripheral corner at the piston head there will be no leakage of fuel during the compression stroke.

It will be understood that the form and arrangements of the parts may be changed without in the least departing from the scope of my invention.

Having thus fully described my invention what I claim as new and desire to secure by Letters Patent of the United States is:—

1. In a four-cycle gas engine in combination, a cylinder, a movable piston therein, a cylinder head having an overhead throat with a combined fuel passage and intake therein, an annular vent below said intake and closed by a puppet intake valve opening inwardly into said cylinder, and a plurality of helically slanting screw blades located in said annular vent and thereby placed near the intake valve to absorb heat therefrom.

2. In a four-cycle gas engine in combination, a cylinder, a movable piston therein, a cylinder head having an overhead throat with a combined fuel passage and intake therein, an annular vent closed by an intake puppet-valve opening inwardly into said cylinder, a plurality of helically slanting screw blades located in said annular vent and a valved air inlet port near the periphery of the cylinder whereby a thin layer of air will be provided between the combustible charge within the cylinder and the walls of the cylinder.

3. In a four-cycle gas engine in combination, a cylinder, a movable piston therein, a cylinder head having an overhead throat with a combined fuel passage and intake therein, an annular vent closed by a puppet intake-valve opening inwardly into said cylinder, means at said intake to bend the passing fuel mixture, a valved air inlet port near the periphery of the cylinder whereby a layer of air may be provided between the fuel mixture within the cylinder and the wall of the cylinder, a valve rod to operate the intake valve from a crank shaft of the engine, and means with said valve rod to actuate the valve of said air inlet port.

4. In a four-cycle gas engine in combination, a cylinder, a movable piston therein, a cylinder head having an overhead throat with a combined fuel passage and intake therein, an annular vent closed by an intake puppet-valve opening inwardly into said cylinder, means for turning the fuel mixture clockwise through the passage way and other means for reversing the clockwise turned fuel mixture into a counter-clockwise turning through said annular vent.

5. In a four-cycle gas engine in combination, a cylinder, a movable piston therein, a cylinder head having an overhead throat with a combined fuel passage and intake therein, an annular vent closed by an intake puppet-valve opening inwardly into said cylinder, a curvated surface at said intake to bend the passing fuel mixture into a turning motion within the cylinder wall and other means for providing a thin layer of air between the fuel mixture within the cylinder and the wall of the cylinder.

6. In a four-cycle gas engine in combination, a cylinder, a movable piston therein, a cylinder head having an overhead throat with a combined fuel passage and intake therein, an annular vent closed by an intake puppet-valve opening inwardly into said cylinder, means at said intake to bend the passing fuel mixture towards the cylinder wall and a valved auxiliary port arranged on a tangent to the inner periphery of the cylinder wall whereby a thin layer of air may be provided between the fuel mixture within the cylinder and the wall of the cylinder.

7. In a four-cycle gas engine in combination, a cylinder, a movable piston therein, a cylinder head having an overhead fuel passage, an annular vent closed by an intake puppet valve opening inwardly into said cylinder, a puppet exhaust valve with a casing adjoining the wall of said fuel passage to heat said wall by the exhaust gases, said wall having a scroll fashion bend around the upper margin of said annular vent for the two-fold function of bending the passing fuel mixture over the entire hot wall and of turning the fuel mixture into a rotary motion for a more uniform absorption of the fuel vapor.

JOHN KONAR.